United States Patent [19]
Colli

[11] Patent Number: 5,963,025
[45] Date of Patent: Oct. 5, 1999

[54] SWITCHING VOLTAGE REGULATOR HAVING A CHARGE PUMP CIRCUIT

[75] Inventor: Gianluca Colli, Santa Clara, Calif.

[73] Assignee: STMicroelectronics, Inc., Carrollton, Tex.

[21] Appl. No.: 08/994,738

[22] Filed: Dec. 19, 1997

[51] Int. Cl.[6] .................................................. G05F 1/575
[52] U.S. Cl. ........................................ 323/288; 323/317
[58] Field of Search .................................. 323/282, 288, 323/312, 315, 317, 351

[56] References Cited

U.S. PATENT DOCUMENTS

| | | | |
|---|---|---|---|
| 4,166,971 | 9/1979 | Schneider ................................. | 323/315 |
| 4,374,357 | 2/1983 | Olesin et al. ........................... | 323/351 |
| 5,045,773 | 9/1991 | Westwick et al. ...................... | 323/315 |
| 5,521,544 | 5/1996 | Hatanaka ................................. | 323/315 |
| 5,585,712 | 12/1996 | Isham ...................................... | 323/315 |
| 5,818,295 | 10/1998 | Chimura et al. ........................ | 323/315 |
| 5,850,139 | 12/1998 | Edwards .................................. | 323/282 |

*Primary Examiner*—Jeffrey Sterrett
*Attorney, Agent, or Firm*—Michael J. Buchenhorner; Theodore E. Galanthay; Lisa K. Jorgenson

[57] ABSTRACT

A voltage regulator (400) having a charge pump includes a bias current circuit (402) which produces a bias current ($I_{bias}$). The bias current ($I_{bias}$) is mirrored by a first mirror circuit (404) and multiplied by gain stage $Q4_{beta}$ and mirrored again by a factor "c" on the output of DMOS2. The same $I_{bias}$ is mirrored by a ratio "b" and multiplied by the product of $Q5_{beta}$ and $Q6_{beta}$. The push-pull current operation at the output terminal (416) is obtained by turning on and off switches SW1 (418) and SW2 (420) that are controlled by a clock signal. The voltage regulator (400) further includes an output voltage clamp (424) that keeps control of the $V_{boost}$ voltage by controlling the amount of bias current ($I_{bias}$).

10 Claims, 10 Drawing Sheets

400

MAX ($V_{GATE} - V_{OUT}$) = 6V

SWITCHING VOLTAGE REGULATOR HAVING A CHARGE PUMP CIRCUIT

FIELD OF THE INVENTION

This invention relates in general to the field of voltage regulators and more particularly to a switching voltage regulator having a charge pump and voltage clamp.

BACKGROUND OF THE INVENTION

An integrated circuit (IC) which is designed to be used as a motor controller IC is typically required to have an extra power supply voltage internally generated to drive the gates of the upper power devices of the output bridges of the IC. This internally generated voltage has to exceed the external power supply voltage to drive the gates of those devices (in source follower configurations) with enough overdrive voltage (Vgs–Vth) to minimize as much as possible the IC's drain-to-source "ON" resistance (RdsOn). Such a situation is highlighted in FIG. 1, in which the internally generated voltage ($V_{boost}$) is shown driving the IC's output power devices.

The usual prior art approaches used to generate this internally generated voltage supply are shown in FIGS. 2 and 3. The prior art approach shown in FIG. 2 highlights a capacitive approach, while the FIG. 3 approach highlights an inductive approach. In maximum attainable voltage is $2V_{supply}-2V_D$, where "$V_D$" is the diode drop that is about 0.75 Volts.

In FIG. 3, the $V_{boost}$ attainable voltage can be higher than that achieved in the circuit for FIG. 2 due to the current kick of the inductor. However, both of these circuits 5 present problems for IC designers due to the size of the capacitors needed to guarantee enough current capability to furnish $V_{boost}$ (current that the $V_{boost}$ can supply without dropping in voltage). These capacitors have to be added externally and cannot be integrated into the IC. The only component that can be integrated in the circuits shown in FIGS. 2 and 3 is the switch. Typically, the simplest way to design this voltage supply is using a CMOS power inverter. However, some drawbacks to these types of designs include possible transconductance, nonoptimized efficiency and the charging and discharging of external capacitors without control.

When designing these ICs, it is also important to find a way to clamp $V_{boost}$ at a certain voltage level due to the maximum voltages that the IC's design process can tolerate. In the above example, a typical MOS device (or DMOS device) can only have six volts as $V_{GS}$ (gate-to-source voltage), so $V_{boost}$ must be clamped as close as possible to the limit, be precise in temperature, and be without process variations. Therefore, in order to avoid reliability problems in production of the IC. A prior generation clamp design used a zener diode and a $V_{BE}$ (base-emitter) as the clamp. However, the total voltage variation of this prior design clamp was higher than one volt, therefore it did not afford much precision. A need exists for a charge pump voltage regulator that can provide good current capability, optimized efficiency and a precise voltage clamp to the voltage required.

DETAILED DESCRIPTION OF THE PREFERRED EMBODIMENT

Figure 1:
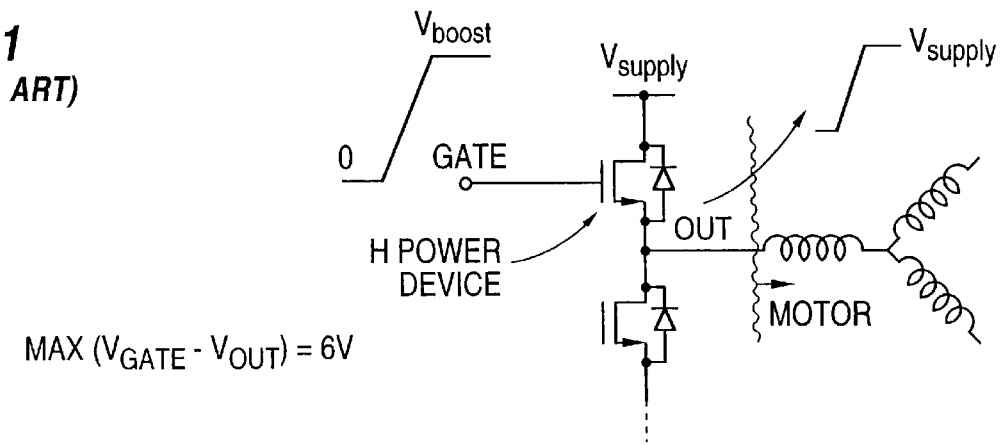
FIG. 1 illustrates a prior art motor controller circuit and motor.
Figure 2:
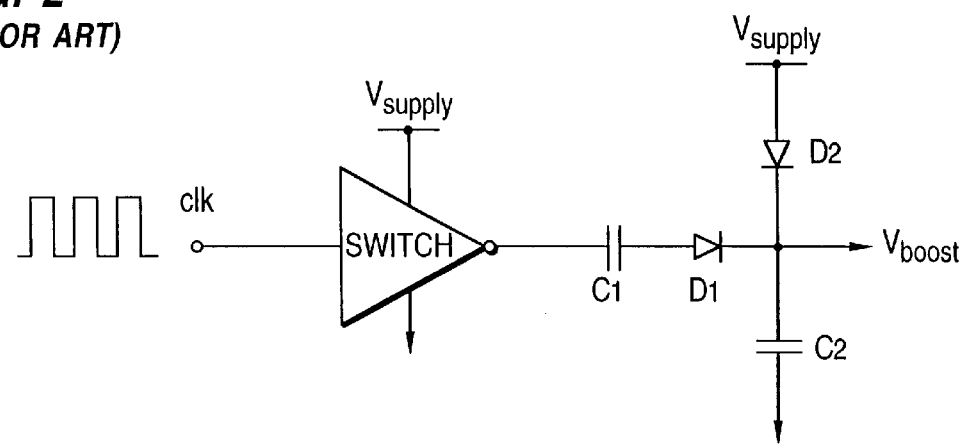
FIG. 2 shows a prior art charge pump highlighting a capacitive application.
Figure 3:
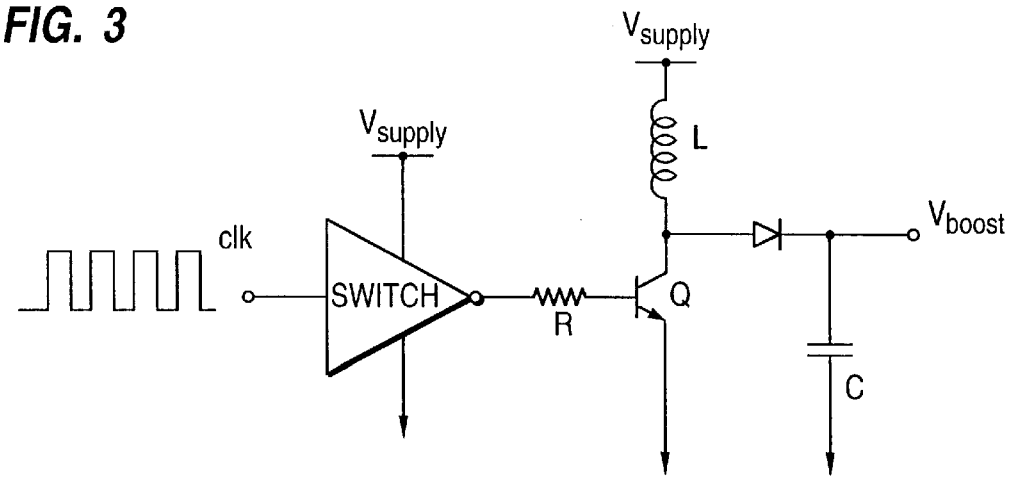
FIG. 3 shows a prior art charge pump highlighting an inductive application.
Figure 4:
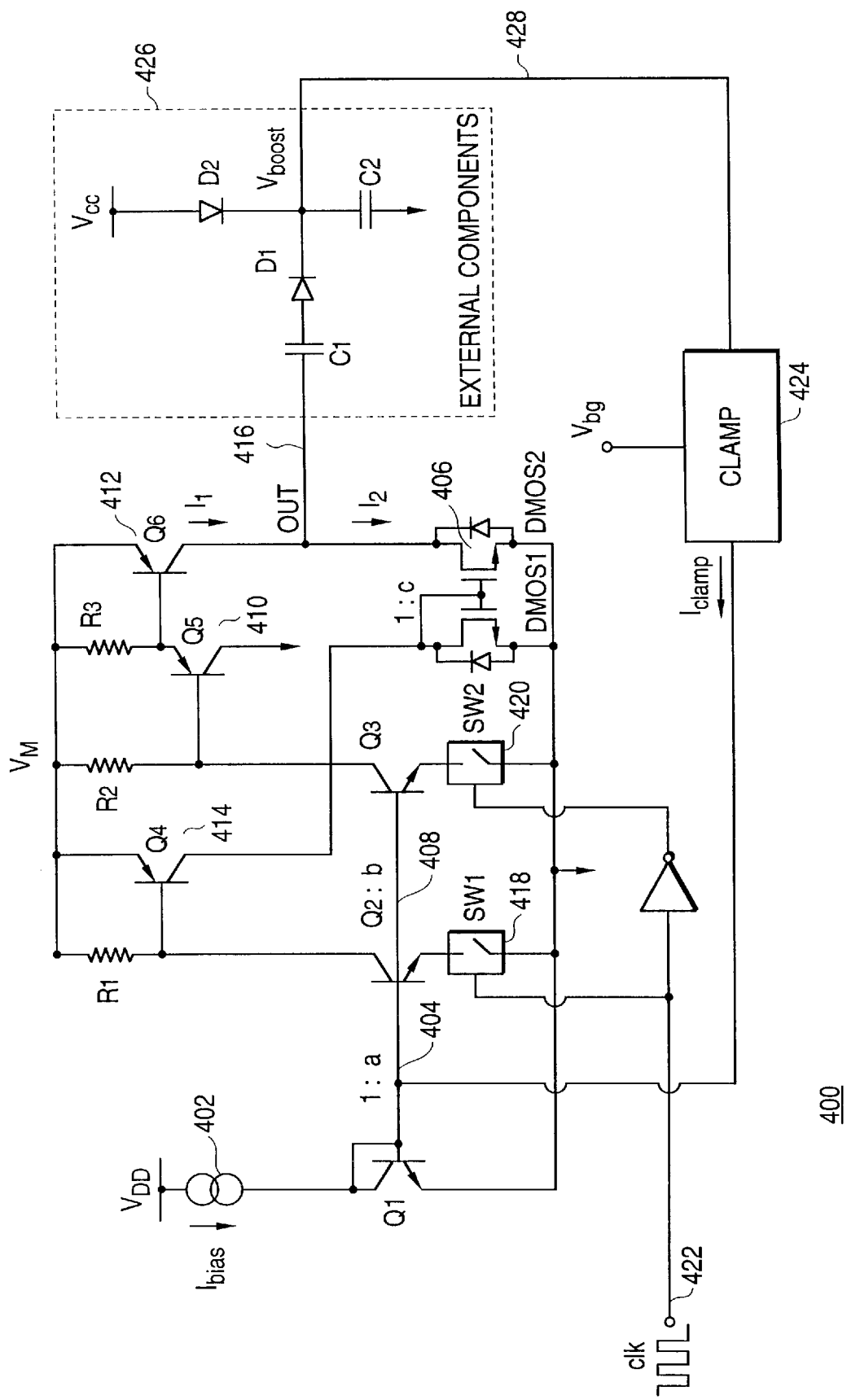
FIG. 4 illustrates a schematic of the voltage regulator (charge pump) of the preferred embodiment of the invention.

Referring now to the drawings and in particular to FIG. 4, there is shown a schematic of a charge pump voltage regulator IC 400 in accordance with the preferred embodiment of the present invention. In the preferred embodiment IC 400 is preferably a motor controller IC. A precise bias current ($I_{bias}$) circuit 402 is mirrored by a first current mirror circuit 404 by a ratio "a". The bias current circuit 402 can be implemented using one of a number of well-known designs. The ratio "a" as well as the other ratios mentioned below for the other mirror circuits can be selected and designed for based on the particular IC design requirements at hand.

The mirrored current of the first current mirror circuit 404 is then multiplied by $Q4_{beta}$ (the beta of transistor Q414). The current is then mirrored again by a factor "c" on the output of DMOS2 by a second current mirror circuit 406. The same $I_{bias}$ of the precise bias current circuit 402 is mirrored by a third mirror circuit 408 by a ratio "b" and multiplied by the product of stages $Q5_{beta}$ of transistor Q5 410 and $Q6_{beta}$ of transistor Q6 412.

The push-pull operation of the output 416 is obtained by turning on-and-off the switching circuits or switches SW1 418 and SW2 420. Switches 418 and 420 are controlled by a clock signal on line 422. In the preferred embodiment the, clock signal on line 422 is internally generated in the IC 400. This clock signal can be generated by a timing or other type of clock generating circuits as is well known in the art.

With the design of the present invention, the maximum current that the circuit can "push" and "pull" to and from the external capacitor C1 shown within external component circuit 426 can easily be controlled. Thereby reducing the large current spikes and cross-conductance found in prior art designs. Circuit 426 highlights the components external to the IC and connected to the output terminal of the IC, in the preferred embodiment the IC is a motor control IC.

Furthermore, the circuit 400 can control the maximum current capability of the circuit, which in equation form is equal to: $I_{load,max}=(I_{C,Q6}$ * the duty cycle of the clock signal (on line 422)), which is the collector current of Q6 multiplied by the duty cycle of clock signal on line 422. The voltage regulator 400 further includes a voltage clamp circuit 424 which clamps the $V_{boost}$ voltage on line 428 to a certain level. The voltage clamp 424 provides protection against over-voltage conditions. The voltage clamp 424 is coupled to the output terminal 416 through external capacitor C1 and external diode D1.

Figure 5:
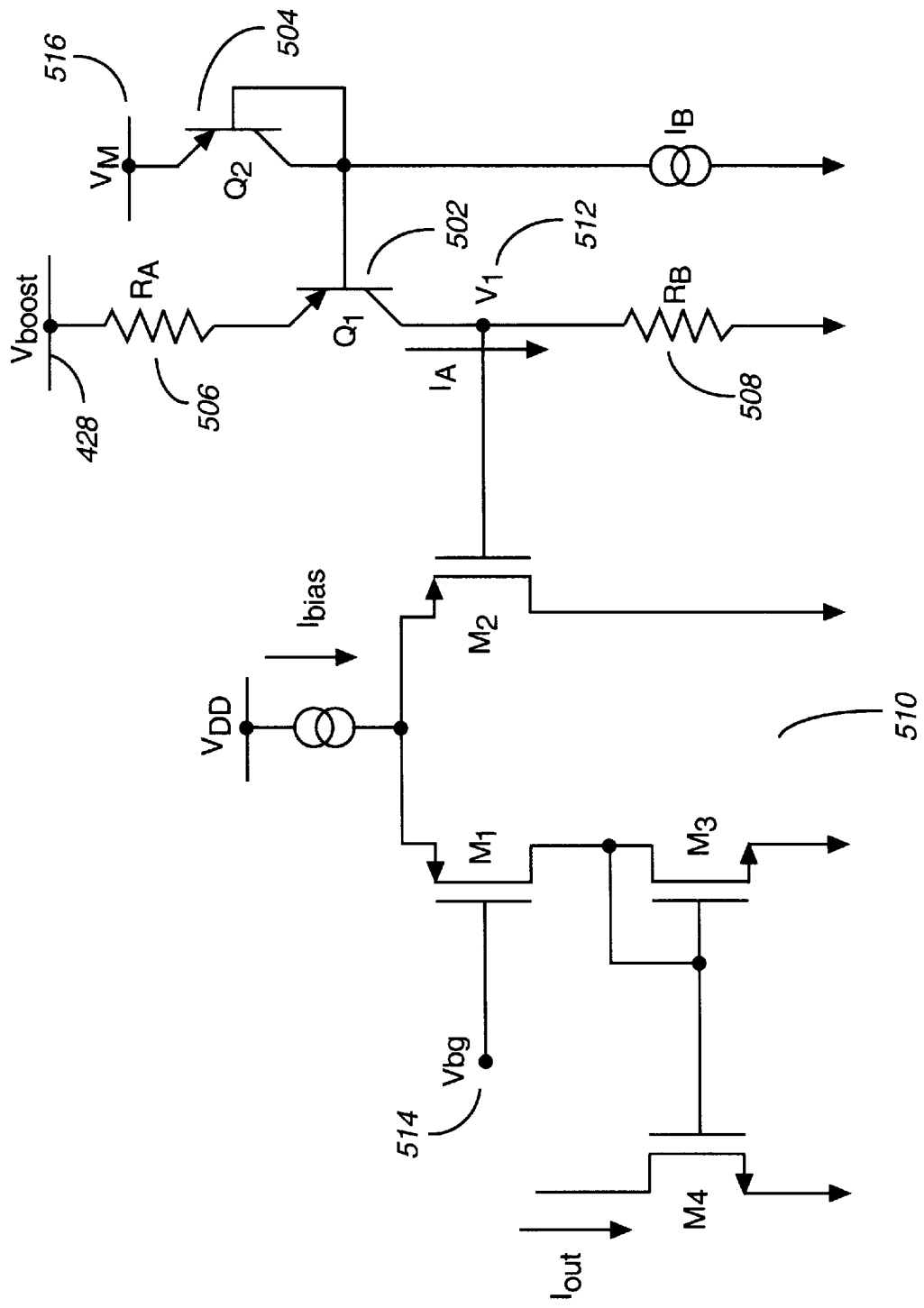
FIG. 5 illustrates a schematic of a voltage clamp implemented using MOS design in accordance with the preferred embodiment of the invention.
Figure 6:
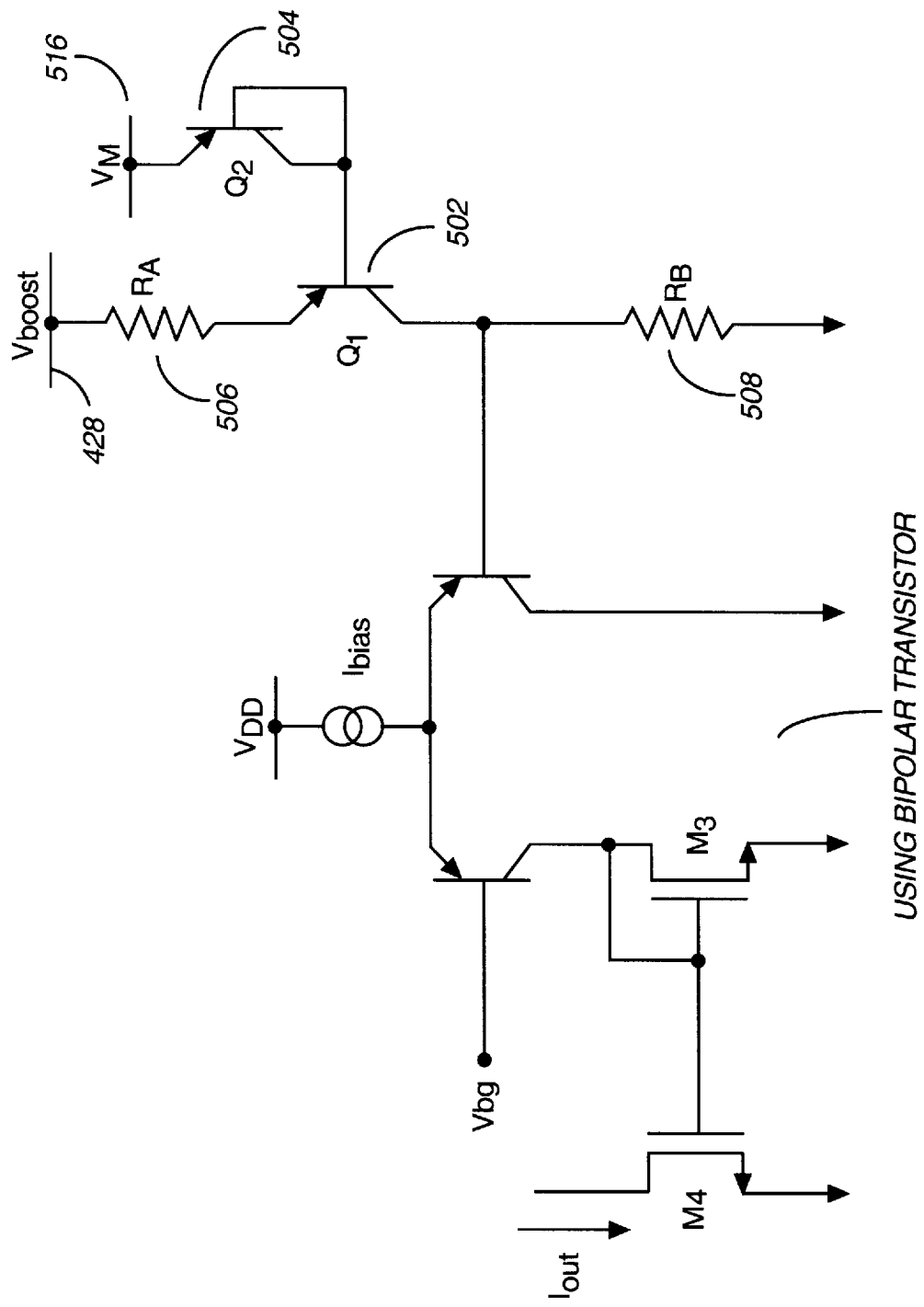
FIG. 6 illustrates an alternate embodiment of the voltage clamp using bipolar design in accordance with the invention.

A more detailed schematic of the voltage clamp circuit 424 is illustrated in FIG. 5. The voltage clamp circuit 424 comprises an up and down level shifter implemented using: transistors Q1 502 and Q2 504; a resistor divider circuit implemented using resistors $R_A$ 506, $R_B$ 508, and current source; and a MOS transconductor circuit 510 as shown in FIG. 5 (or using a bipolar transconductor as shown in FIG. 6).

Normally, when the value of $V_{boost}$ on line 428 is less than $V_M + V_{clamp}$ (e.g., $V_M$ can be 12 or 5 volts, $V_{clamp}$ can be about 6 volts), then the voltage at node $V_1$ 512 is lower than voltage $V_{bg}$ that is provided by a very precise voltage reference circuit (not shown), and the output clamp current ($I_{out}$) is zero. If the output clamp current is substantially zero, then the charge pump 400 can provide to the output terminal 416 all the current to its capacity (note that during power up, the circuit is not yet in regulation).

When $V_{boost}$ on line 428 reaches the value of $V_{boost} + V_{clamp}$, then the voltage at node $V_1$ 512 is approximately equal to the voltage at node $V_{bg}$ 514, or is a little bit lower (e.g., within a few millivolts, approximately 25–30 millivolts), and the transconductor 510 begins to generate an output control current proportional to: $G_{m,\ transconductor} * (V_{bg} - V_1)$, where $G_m$ is the transconductance for device 510. This control current, labeled $I_{clamp}$, reduces the $I_{bias}$ that determines the charge pump's output current. Using this current feedback, the charge pump output current is adjusted exactly to the value necessary to support the $I_{load}$ required in that moment from $V_{boost}$ in the regulation mode.

The relative precision of the $V_{clamp}$ for different $I_{load}$ depends on the value of "Gm" for the transconductance stage. The absolute precision of the clamp 424 is fixed by the resistor divider formed by resistors $R_A$ 506 and $R_B$ 508, and the precision is as good as the matching of the two resistors in the IC design. The process variation and the temperature effects are at the first order compensated by the design structure. There are slight performance differences between the ideal calculated $V_{clamp}$ value and simulated one, which are attributed to such factors as: no perfect matching between $I_A$ and $I_B$ in temperature and process that causes a voltage error of about 5–10 mV; the voltage offset of the transconductor 510 that is about 25 mV when designed in MOS and about 3 mV when designed in bipolar; and the loop gain which although preferably set low to avoid stability issues, introduces errors especially for different $I_{load}$. In FIG. 6 a voltage clamp implemented using a bipolar design is shown.

The formulas to determine $V_{clamp}$, $I_A$ and $V_1$ are as follows:

$V_{clamp} = V_{boost} - (V_M - (V_{BEQ2} - V_{BEQ1}))$ which is approximately equal to, $V_{boost} - V_M$, which is approximately equal 6 Volts; $IA = V_{clamp}/R_A$; and $V_1 = I_A * R_B$. After determining the values of $V_{clamp}$ and $V_1$, it is possible to size, $I_A$ and the resistor as required for the design at hand. In this example:

$I_A$=approximately 58 $\mu$A, $V_1$=1285 mV, $V_{bg}$=1.225 Volts, Clock Frequency=200 kilohertz and $V_{clamp}$=6 Volts.

Figure 7:
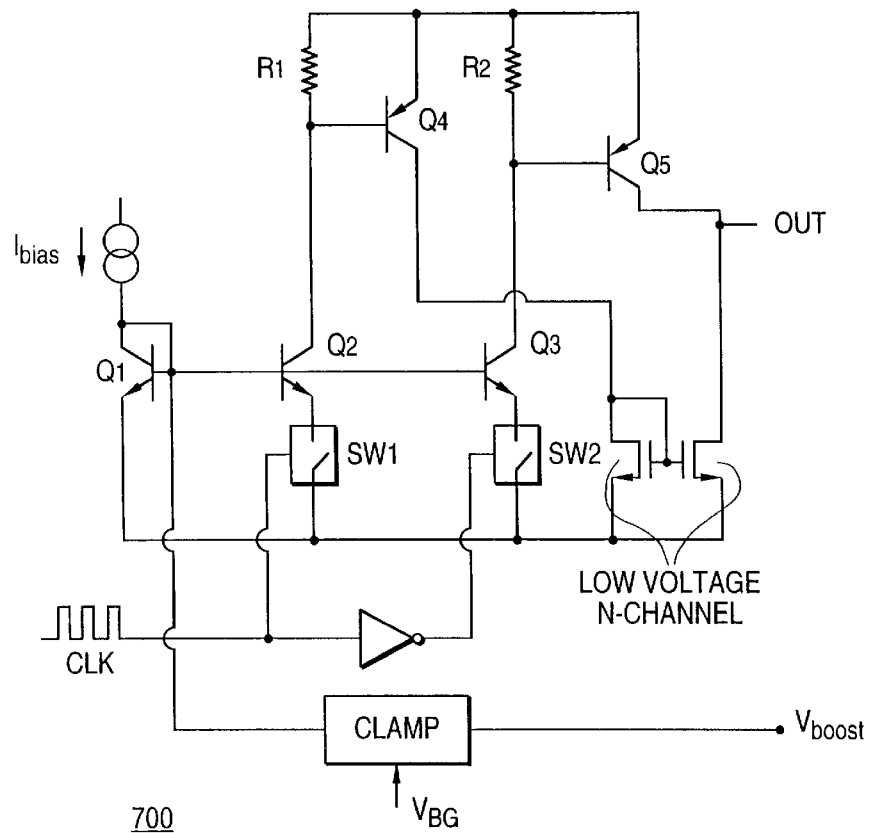
FIGS. 7 and 8 illustrate alternate embodiments for low voltage implementations of the voltage regulator (charge pump) shown in FIG. 4.
Figure 8:
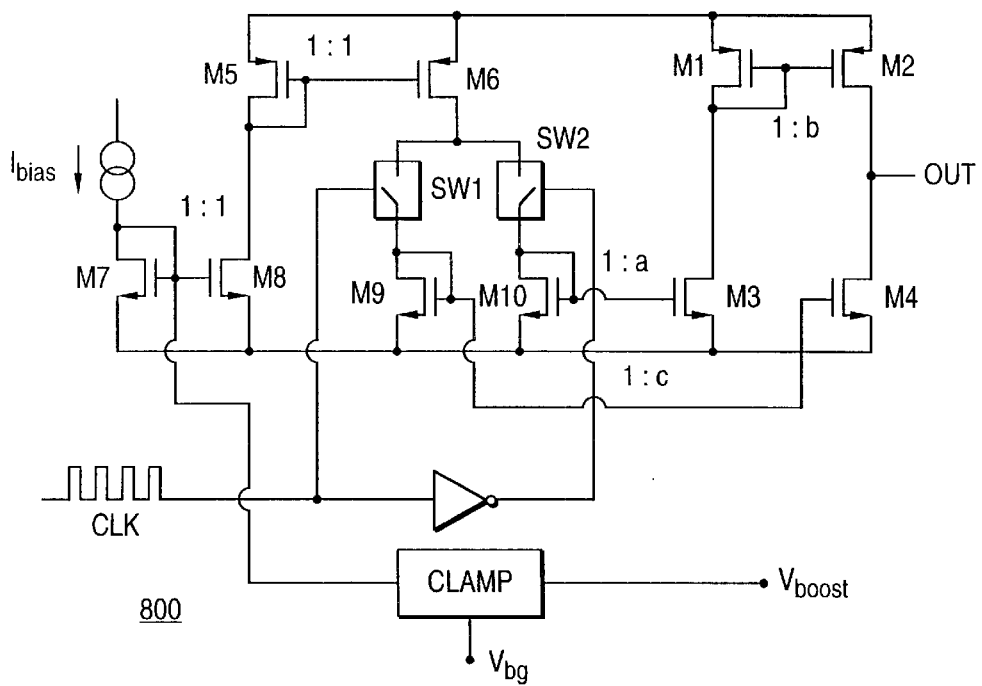

Referring now to FIG. 7, an alternate embodiment for a low voltage charge pump and clamp design in accordance with the invention is shown. The circuit 700 shown is capable of operating down to $V_{supply} = V_{BE} + VGS_{N\text{-}ch,yo}$ or approximately between 1.6 and 1.8 volts. Charge pump 800, shown in FIG. 8, is another alternate embodiment showing a low voltage CMOS design. In this design solution, the maximum voltage is equal to $V_{GS(M1)} + V_{DSM3}$, which equals to a maximum voltage of approximately 1.3 volts.

Figure 9:
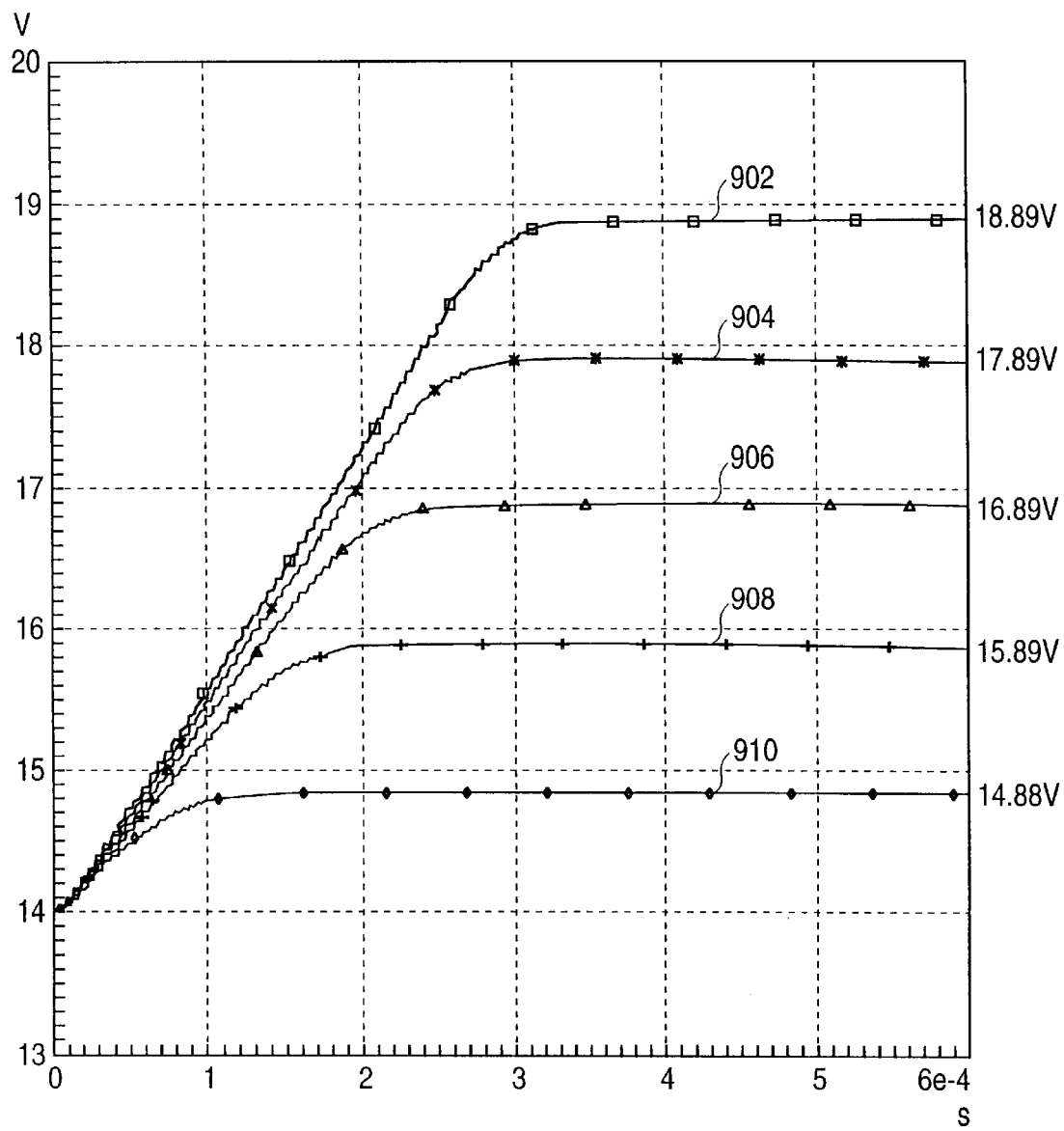
FIGS. 9–12 illustrate different performance simulation graphs for the different embodiments of the present invention.

In FIG. 9, a graph highlighting the different circuit simulation results obtained for $V_{boost}$ for different values of $V_M$ for voltage regulator 400 at a load current ($I_{load}$) of one milliamp (mA) are shown. Graph line 902 is for a $V_M$=13 volts, graph line 904 is for a $V_M$=12 volts, graph line 906 is for a $V_M$=11 volts, graph line 908 is for a $V_M$=10 volts and finally, graph line 910 is for a $V_M$=9 volts. The resulting $V_{boost}$ values are shown on the graph next to their respective graph line. This graph highlights the linear relationship between $V_{boost}$ and $V_M$ for a particular load current produced by the voltage regulator 400.

Figure 10:
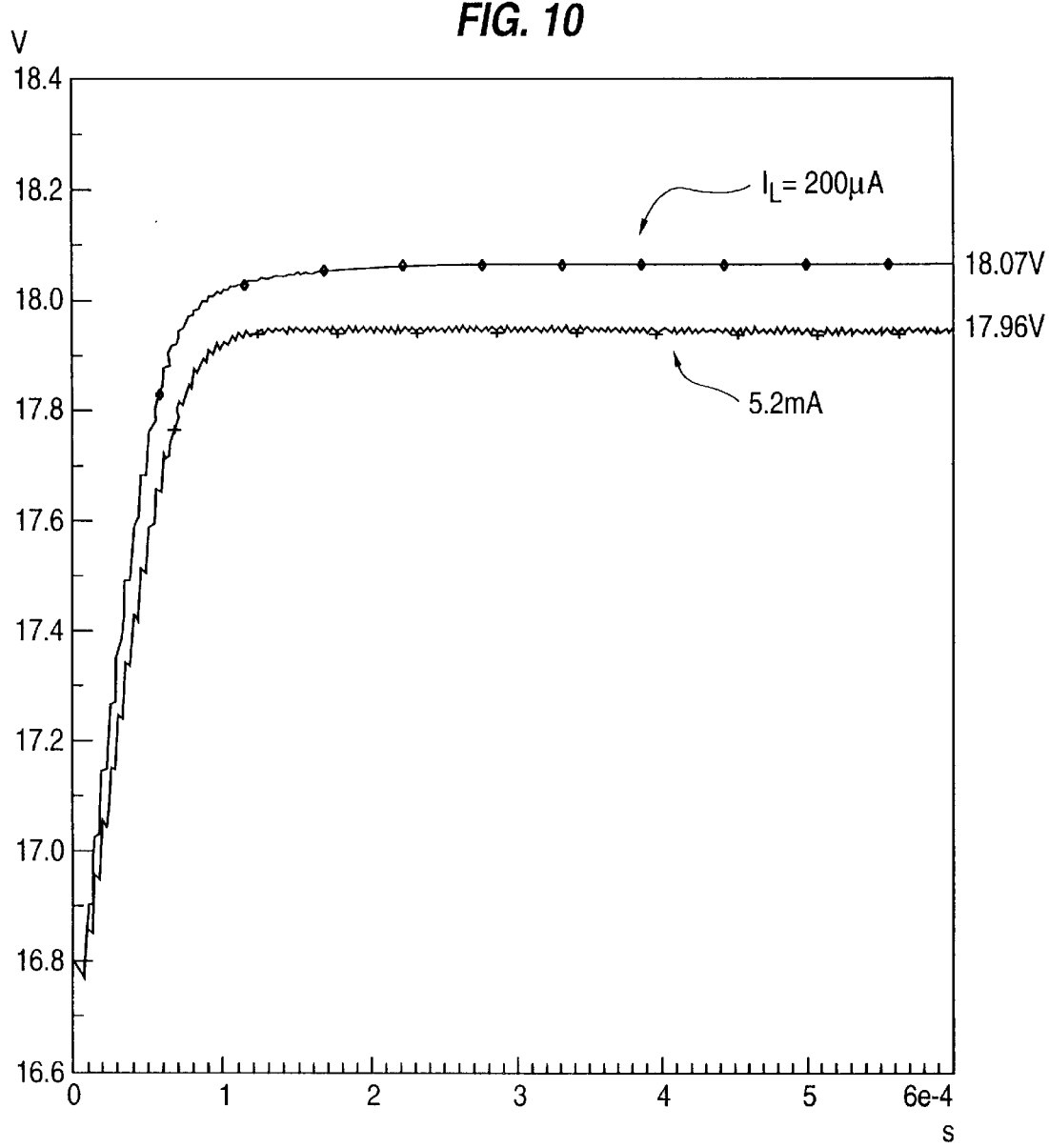
Figure 11:
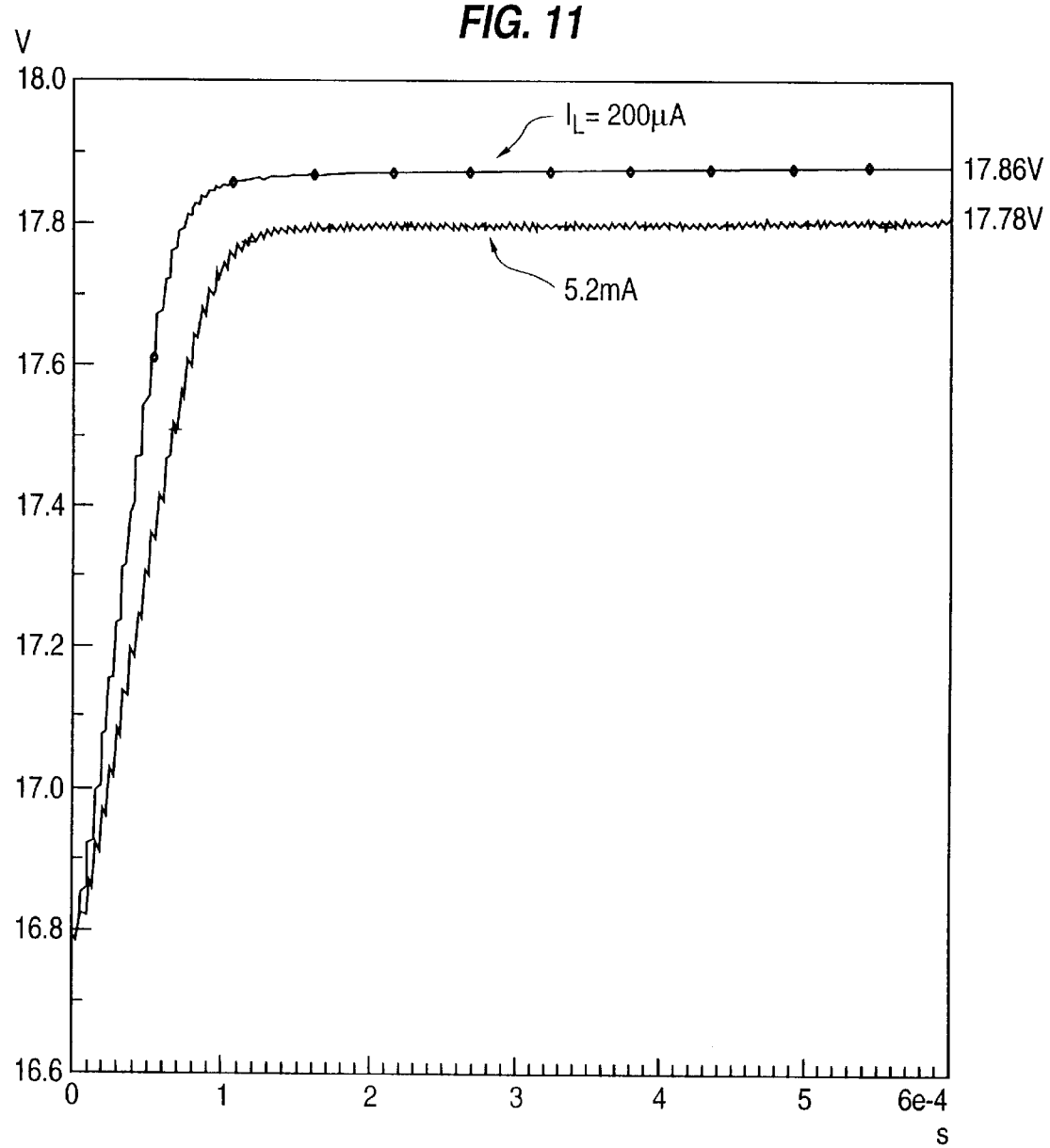
Figure 12:
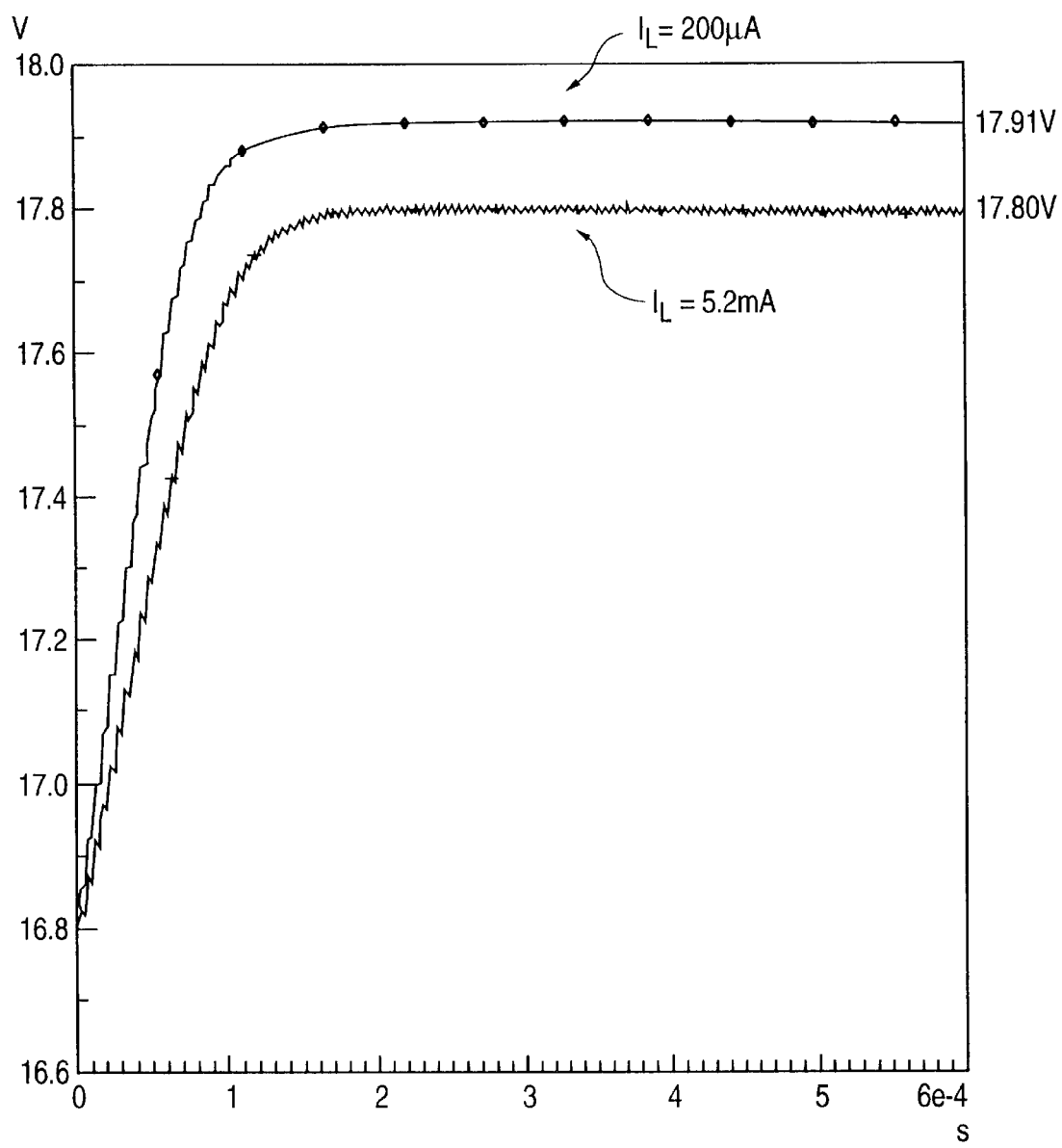

FIG. 10 highlights a simulation graph for circuit 400 using a MOS transconductor in clamp 424 as shown in FIG. 5. The delta $V_{boost}$ ($\Delta V_{boost}$) between a load current ($I_{load}$) of 200 $\mu$A and for 5.2 milliamps is shown to equal 110 mV (18.07–17.96 Volts). The simulation graph of FIG. 11 highlights the results for circuit 400 using a bipolar design in clamp 424 as shown in FIG. 6. The delta $V_{boost}$ in this example is equal to 70 mV (17.86–17.79 Volts). FIG. 12 shows a second simulation run using a MOS transconductor in clamp 424 as shown in FIG. 5. Like in FIG. 10, the resulting $\Delta V_{boost}$ is equal to 110 mV.

Figure 13:
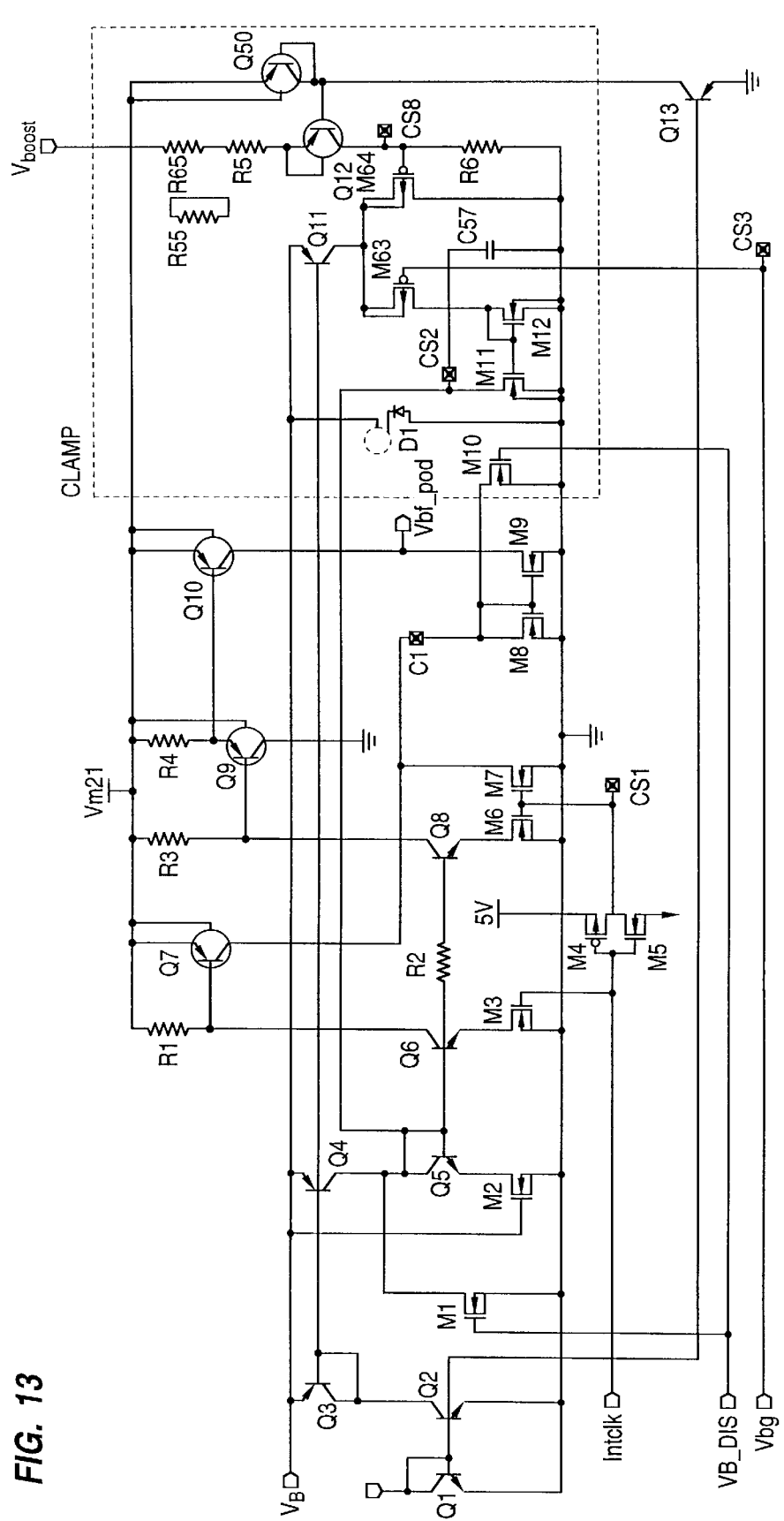
FIG. 13 illustrates an IC embodiment for the present invention.

FIG. 13 highlights a complete IC schematic for circuit 400 including the clamp 424. In FIG. 13, the following notes are applicable to the IC design:

i. Q1–Q2 are matched;
ii. Q3–Q6–Q8 are matched;
iii. Q5–Q6–Q8 are matched;
iv. M2–M3–M6 are matched;
v. M11–M12 are matched and by 10/1.2 devices in parallel;
vi. M13–M14 are matched;
vii. All n-channel devices in the same pocket; and
viii. R5–R6–R54–R55–R56 are matched.

The switching voltage regulator (charge pump) of the present invention provides precise voltage clamping independent from temperature and process variations. The present invention provides for a voltage regulator having a charge pump which is able to provide good current capability, optimized efficiency and a precise voltage clamp at the required voltage.

While the present invention has been described in conjunction with specific embodiments, it is evident that many alternatives, modifications and variations will be apparent to those skilled in the art in light of the foregoing description. Accordingly, it is intended that the present invention embrace all such alternatives, modifications and variations as fall within the broad scope of the appended claims.

What is claimed is:

1. A voltage regulator with a charge pump circuit for use in a semiconductor integrated circuit having an output terminal, comprising:

a bias current circuit providing a bias current ($I_{bias}$);

a first mirror circuit coupled to the bias current circuit which mirrors $I_{bias}$ by a defined first ratio and provides a first mirrored current;

a first gain stage coupled to the first mirror circuit which provides a gain adjustment to the first mirrored current;

a second mirror circuit coupled to the first gain stage which mirrors the gain adjusted first mirrored current by a defined second ratio and provides a second mirrored current at the output terminal;

a third mirror circuit coupled to the bias current circuit which mirrors $I_{bias}$ by a defined third ratio and provides a third mirrored current;

and a second gain stage coupled to the third mirror circuit which provides a gain adjustment to the third mirrored current and provides a gain adjusted third mirrored current at the output terminal.

2. The voltage regulator defined in claim 1, further comprising:

first and second switching circuits;

a clock circuit coupled to the first and second switching circuits, the clock circuit generating a clock signal which controls the operation of the first and second switching circuits; and said first and second switching circuits controlling the switching between of the gain adjusted first mirrored current and the gain adjusted third mirrored current to the output terminal.

3. The voltage regulator defined in claim 2, wherein said first and second switching circuits alternate between applying the gain adjusted first mirrored current and the gain adjusted third mirrored current to the output terminal.

4. The voltage regulator defined in claim 3, further comprising:

a voltage clamp circuit coupled to the output terminal.

5. The voltage regulator defined in claim 4, wherein the voltage clamp comprises:

a level shifter;

a voltage divider coupled to the level shifter; and a transconductor coupled to the voltage divider, the transconductor providing a control current which adjusts the bias current ($I_{bias}$).

6. The voltage regulator defined in claim 5, wherein the control current provided by the voltage clamp reduces the amount of bias current provided by the bias current circuit.

7. A charge pump circuit having an output terminal, comprising:

first and second switching circuits;

a clock circuit coupled to the first and second switching circuits, the clock circuit generating a clock signal which controls the operation of the first and second switching circuits, the first and second switching circuits controlling the flow of current to and from the output terminal; and a voltage clamp, the voltage clamp including:

a level shifter;

a voltage divider coupled to the level shifter; and a transconductor coupled to the voltage divider, the transconductor providing a control current which adjusts the amount of current which is pushed and pulled to and from the output terminal.

8. The charge pump circuit defined in claim 7, wherein the transconductor receives a reference voltage.

9. The charge pump circuit defined in claim 8, wherein the control current generated is a function of the transconductor's Gm (transconductance).

10. The charge pump circuit defined in claim 7, wherein the charge pump circuit is located within a motor control integrated circuit.

* * * * *